US007866710B2

(12) United States Patent
Sheppard et al.

(10) Patent No.: US 7,866,710 B2
(45) Date of Patent: Jan. 11, 2011

(54) TWO PIECE QUICK CONNECT RETAINER

(75) Inventors: Jeff Sheppard, Milton (CA); Dario Bettio, Mississauga (CA)

(73) Assignee: Dana Canada Corporation, Oakville, Ontario (CA)

( * ) Notice: Subject to any disclaimer, the term of this patent is extended or adjusted under 35 U.S.C. 154(b) by 956 days.

(21) Appl. No.: 11/465,601

(22) Filed: Aug. 18, 2006

(65) Prior Publication Data

US 2007/0040378 A1    Feb. 22, 2007

Related U.S. Application Data

(63) Continuation-in-part of application No. PCT/CA2005/000218, filed on Feb. 18, 2005, which is a continuation-in-part of application No. 10/782,669, filed on Feb. 19, 2004, now Pat. No. 7,249,788.

(30) Foreign Application Priority Data

Feb. 19, 2004    (CA)    ................................. 2457978

(51) Int. Cl.
F16L 37/08    (2006.01)
(52) U.S. Cl. .................. 285/319; 285/322; 285/921; 285/243
(58) Field of Classification Search .......... 285/319, 285/322, 323, 921, 243
See application file for complete search history.

(56) References Cited

U.S. PATENT DOCUMENTS

| 2,543,087 | A | 2/1951 | Woodling |
|---|---|---|---|
| 2,543,088 | A | 2/1951 | Woodling |
| 3,724,882 | A | 4/1973 | Dehar |
| 3,810,073 | A | 5/1974 | Zajac et al. |
| 4,269,438 | A | 5/1981 | Ridenour |
| 4,332,402 | A | 6/1982 | Shellhause |
| 4,573,716 | A | 3/1986 | Guest |
| 4,781,400 | A | 11/1988 | Cunningham |
| 4,828,297 | A | 5/1989 | Tarum |
| 4,925,217 | A | 5/1990 | Ketcham |
| 4,948,180 | A | 8/1990 | Usui |
| 5,069,489 | A | 12/1991 | Bartholomew |
| 5,141,264 | A | 8/1992 | Usui |
| 5,172,940 | A | 12/1992 | Usui et al. |
| 5,176,412 | A | 1/1993 | Washizu |

(Continued)

FOREIGN PATENT DOCUMENTS

CA    2217508    10/1997

OTHER PUBLICATIONS

General Motors Corporation, Engineering Standards, General Specification HVAC & PT Cooling, Transmission and Engine Oil Cooler Plumbing System, Feb. 2002.

(Continued)

*Primary Examiner*—James M Hewitt
(74) *Attorney, Agent, or Firm*—Ridout & Maybee LLP

(57) ABSTRACT

A connector assembly having a male member, a female member and a retainer for releasably securing the male member and the female member. The retainer has inner retainer arms for engaging the male member and an interior portion of the female member, and an outer retainer flange for engaging an outer portion of the female member.

31 Claims, 19 Drawing Sheets

U.S. PATENT DOCUMENTS

| | | | |
|---|---|---|---|
| 5,219,188 A * | 6/1993 | Abe et al. ..................... 285/93 |
| 5,303,963 A | 4/1994 | McNaughton et al. |
| 5,462,313 A | 10/1995 | Rea et al. |
| 5,542,717 A | 8/1996 | Rea et al. |
| 5,738,387 A | 4/1998 | Guest |
| 6,155,607 A | 12/2000 | Hewitt et al. |
| 6,186,561 B1 * | 2/2001 | Kaishio et al. .............. 285/319 |
| 6,267,416 B1 | 7/2001 | Ferreira et al. |
| 6,343,814 B1 | 2/2002 | Bucher et al. |
| 6,447,024 B1 | 9/2002 | Olson |
| 6,454,314 B1 * | 9/2002 | Grosspietsch et al. ....... 285/319 |
| 6,536,807 B1 | 3/2003 | Raymong et al. |
| 6,676,171 B2 | 1/2004 | Bucher et al. |
| 2003/0006610 A1 * | 1/2003 | Werth ......................... 285/243 |
| 2003/0168856 A1 | 9/2003 | Kaminski et al. |

OTHER PUBLICATIONS

International Search Report dated May 17, 2005 for PCT/CA2005/000218.

* cited by examiner

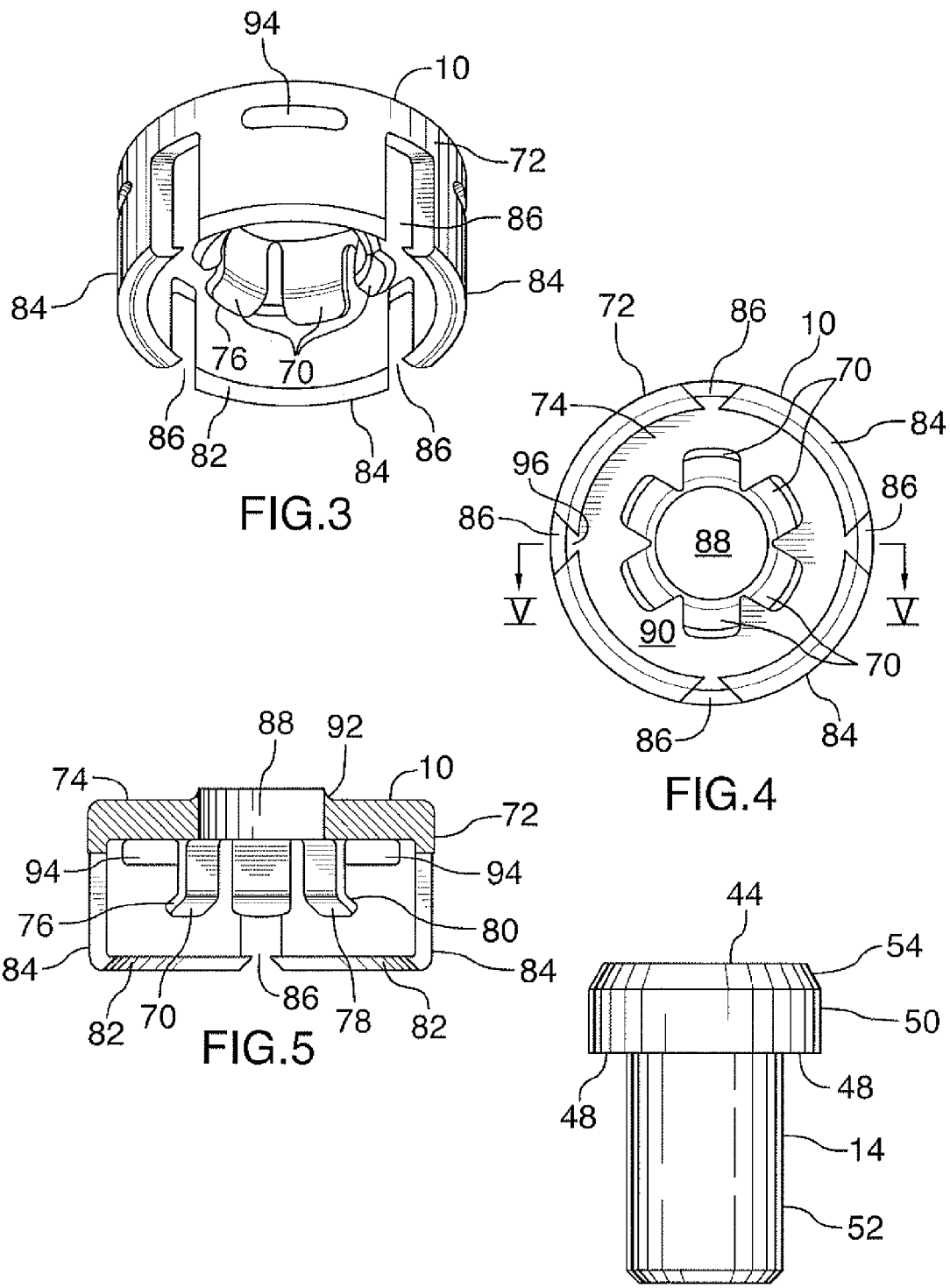

TWO PIECE QUICK CONNECT RETAINER

CROSS-REFERENCE TO RELATED APPLICATIONS

This application is a continuation-in-part (CIP) under 35 U.S.C. §120 and §§365(c) of PCT International Application No. PCT/CA2005/000218 filed 18 Feb. 2005, which is a continuation-in-part (CIP) of U.S. application Ser. No. 10/782,669 filed on 19 Feb. 2004, now U.S. Pat. No. 7,249,788, and the PCT Application No. PCT/CA2005/000218 also claims priority under the PCT to Canadian Patent Application No. 2,457,978 filed 19 Feb. 2004 filed in the Canadian Patent Office. The entire disclosures of PCT Application No. PCT/CA2005/000218, U.S. application Ser. No. 10/782,669, and Canadian Patent Application No. 2,457,978 are hereby incorporated by reference herein in their entirety.

BACKGROUND

This invention relates to a connector assembly for connecting male and female members.

Many types of connector assemblies exist for releasably connecting sections of fluid-carrying conduits. Such connector assemblies may be used, for example, in the heat exchanging systems of a motor vehicle which incorporate both rigid and flexible tubing elements.

It is desirable for a connector assembly to provide a secure, reliable and durable connection that can be connected and disconnected with relative ease, while at the same time being easy and cost effective to manufacture. Existing connector assembly systems have limitations in one or more of these features.

SUMMARY

Examples of the invention provide a connector assembly having a male member, a female member and a retainer for releasably securing the male member and the female member. The retainer has inner retainer arms for engaging the male member and an interior portion of the female member, and an outer retainer flange, which can take the form of a plurality of fingers, for engaging an outer portion of the female member.

According to one example, there is provided a connector assembly including a male member having a first external shoulder on an outer surface thereof and a female member having a cavity defined by an inner circumferential wall for receiving the male member. The cavity extends from a first end to an interior portion of the female member and the inner circumferential wall defines an internal shoulder. At least two plastic retainer portions are rigidly secured in snap-fit relation to one another to define an annular retainer member which surrounds a portion of the male member. Each of the at least two retainer portions forms a respective sector of the annular retainer member. The retainer member includes a plurality of circumferentially spaced resilient internal retainer arms and an annular external retainer flange for engaging an outer portion of the female member. The external flange is radially spaced from the internal retainer arms and is connected thereto by a radial joining member. The internal retainer arms each have a distal end for engaging the male member external shoulder and the female member internal shoulder when the male member is within the female member.

According to another example of the invention there is provided a retainer member for releasably securing a tubular male member and a tubular female member, the tubular male member having an increased diameter circumferential portion and the tubular female member having an inner annular wall defining a cavity opening at a first end of the female member for receiving the male member, the inner annular wall having an annular groove formed therein and spaced apart from the first end, the female member further having an outer annular wall. The retainer member includes two plastic retainer portions rigidly secured in snap-fit relation to one another to define interior retainer means and outer retainer means. The interior retainer means is for insertion within the cavity for engaging the increased diameter circumferential portion and a side of the annular groove when the male member is joined to the female member to act against axial separation of the male and female members. The outer retainer means is spaced radially apart from the interior retainer means and is for engaging the female member outer annular wall when the male member is joined to the female member.

According to a further non-limiting example, there is provided a method for releasably connecting a pair of fluid-carrying conduits. The method comprises the steps of securing to or forming on an end of one of the pair of conduits a male member having a first external shoulder on an outer surface thereof; and securing to or forming on an end of the other of the pair of conduits a female member. The female member has a cavity defined by an inner circumferential wall for receiving the male member, the cavity extending from a first end to an interior portion of the female member, the circumferential wall defining an internal shoulder. The method further comprises the step of providing at least two plastic retainer portions adapted to be rigidly secured to one another to define an annular retainer member surrounding a portion of the male member, each of said at least two retainer portions forming a respective sector of the annular retainer member. The retainer member includes a plurality of circumferentially spaced resilient internal retainer arms and an annular external retainer flange for engaging an outer portion of the female member, the external flange being radially spaced from the internal retainer arms and connected thereto by a radial joining member, the internal retainer arms each having a distal end for engaging the male member first external shoulder and the female member internal shoulder when the male member is within the female member. The method further comprises the steps of positioning said at least two plastic retainer portions in surrounding relation around said portion of the male member and rigidly securing same together; and fitting the male member into the female member such that the annular external retainer flange engages the outer portion of the female member and the distal ends of the internal retainer arms engage the male member first external shoulder and the female member internal shoulder.

BRIEF DESCRIPTION OF THE DRAWINGS

FIG. 3 is a perspective view of a retainer of the connector assembly of FIG. 1;

FIG. 4 is an end view of the retainer of FIG. 3;

FIG. 5 is a sectional view of the retainer, taken along the line V-V of FIG. 4;

FIG. 6 is a side elevation of a female member of the connector assembly of FIG. 1.

Like reference numerals are used throughout the Figures to denote similar elements and features.

DETAILED DESCRIPTION OF THE EXAMPLE EMBODIMENTS

FIGS. 1-6 show an example embodiment of a connector assembly which includes a retainer member 10, a tubular male member 12 and a tubular female member 14. In the illustrated embodiment, the female member 14 and the male member 12 are adapted to be suitably secured to tubing elements. The male and female members are operative in response to insertion of the male member 12 into the female member 14 to releasably connect the male member to the female member and form a continuous fluid passage through the coupling to establish fluid communication between the tubing elements associated with the connector members.

Figure 1:
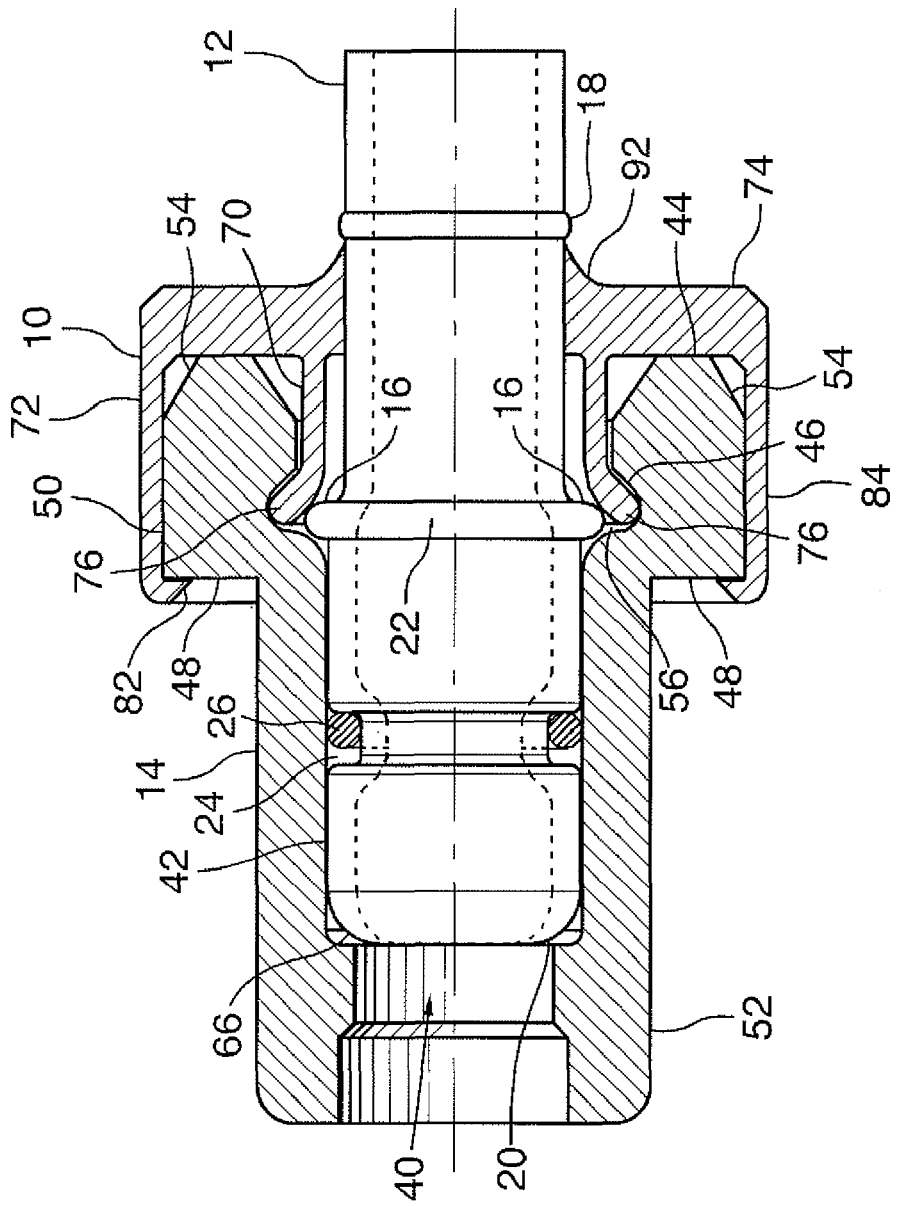
FIG. 1 is a sectional view of a connector assembly in an assembled state, according to example embodiments of the invention.
Figure 2:
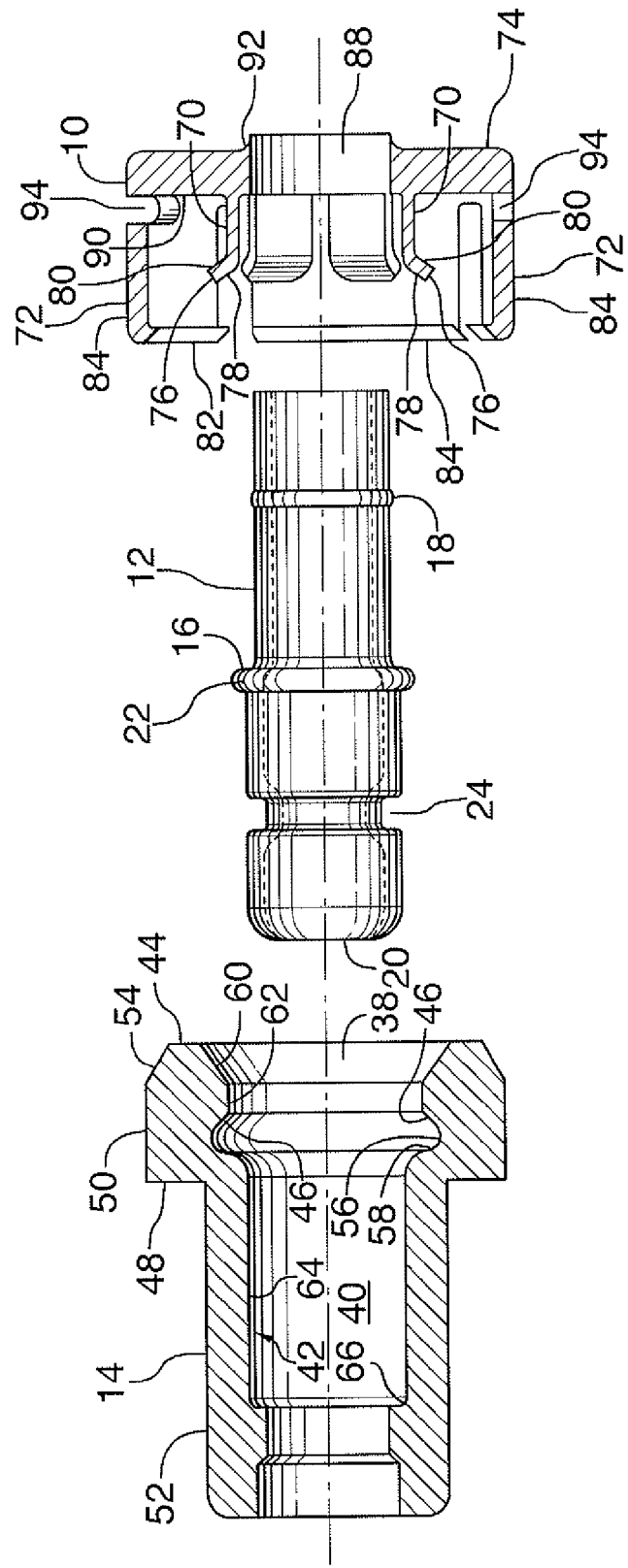
FIG. 2 is a sectional view of the connector assembly of FIG. 1 in a disassembled state.

As best seen in FIG. 2, the male member 12, of a predetermined diameter, has a front or connecting end 20 and includes an outwardly extending shoulder or protrusion 16. In the illustrated example, the shoulder 16 is provided by an annular bead or ring 22 positioned at a predetermined distance from the connecting end 20 of the male member 12. In an example embodiment, the ring 22 is an integral part of the male member 12, the male member 12 with the ring 22 being formed from a metal material such as steel, aluminium, brass or copper or from a non-metallic material such as plastic, or a composite material, among other things. The ring 22 could also be a separate part attached to male member 12. In some example embodiments, the shoulder 16 could be provided by a structure other than ring 22. For example, a step decrease in the diameter of the male member 12 could provide shoulder 16. In an example embodiment, an annular sealing member groove 24 is provided about a circumference of the male member 12 at a location between connector end 20 and ring 22 for receiving a resilient sealing ring 26 (see FIG. 1). In a further example embodiment, the annular groove 24 may alternatively be provided on an inner wall of female member 14.

In the illustrated embodiment, the portion of the male member 12 between ring 22 and front end 20 has a slightly larger diameter than the portion of male member 12 that extends beyond annular ring 22. In some embodiments, this difference in diameter size may not be present, or may be reversed. A further annular ring or projection 18 is formed on the male member 12 on a side of annular ring 22 that is opposite to the connecting end 20.

The female member 14 includes a cavity 40 having an entrance 38 at a connecting or front end 44 of the female member for receiving the male member 12. The cavity 40 is defined by an inner circumferential wall 42. In an example embodiment, the inner wall 42 includes a number of successive wall sections along which the diameter of the cavity 40 varies. In particular, the inner wall 42 includes, beginning at the first end 44 of the female member and working inwards, a first wall section 60, a second wall section 62, a groove wall section 56, and a third wall section 64. The first wall section 60 decreases in diameter inwardly from the first end 44 to the second wall section 62, which has a substantially uniform diameter. Annular groove section 56 is located between second wall section 62 and third wall section 64. Third wall section 64 has a substantially uniform diameter as well. The groove 56 provides a circumferential annular shoulder 46 on one side thereof, and a further shoulder or side 58 which is generally opposed to shoulder 46. An annular shoulder 66 may be provided at the inner end of the third wall section 64.

The female member 14 includes an enlarged outer portion near end 44. In particular, the outer surface of the female member 14 is defined by an outer annular wall which has a first section 50 and a second section 52, the first section 50 being located between the first end 44 and the second section 52 and having an outer diameter greater than that of the second section 52. An annular shoulder 48 that faces away from end 44 forms the transition between the first outer wall section 50 and the second outer wall section 52. The outer annular wall includes a third section 54 that extends from the first end 44 to the second outer wall section 50. The diameter of the third section 54 increases from the first end 44 to the second section 50. Thus, exterior wall section 54 and interior wall section 60 are bevelled in opposite directions at first end 44. As with male tubular member 12, female member 14 may be formed from a material such as steel, aluminium, brass, copper or other metal or metal alloy material, or may be made from a material such as plastic or a composite material, or other suitable materials.

The retainer member 10 is adapted to be slid along the male member 12 and includes a disc-like central body or joining member 74 from which a plurality of internal or interior retainer arms 70 axially extend. The joining member 74 includes a central opening 88 through which the male member 12 passes. The internal retainer arms 70 are arranged about a circumference of the central opening 88 and are spaced slightly back from the opening 88. An outer retaining flange 72 extends from around an outer edge of the joining member 74 such that the outer retainer flange 72 is radially spaced from the internal retainer arms 70.

The retainer arms 70 are resilient extensions which extend substantially perpendicular from an inner surface 90 the joining member 74. The internal retainer arms 70 extend along a longitudinal axis of the male member 12. The retainer arms 70 and the external flange 72 are both formed from a resilient material such that they can be temporarily deformed when the male member 12 is connected to and disconnected from the female member 14. In an example embodiment, the retainer 10 is of unitary construction and formed from a resilient material such as plastic. However, in various embodiments the retainer 10 may be formed from other materials including metal and composite materials, and may be formed as separate pieces that are subsequently connected together.

The specific shape of the retainer arms 70 is determined by the force needed to mount the retainer 10 and the force needed to retain the male member 12 in the female member 14. In an example embodiment, the internal retainer arm 70 each include a distal end 76 spaced apart from the joining member 74. The distal ends 76 are angled radially outward and have opposite facing first and second sides 78, 80.

As best seen in FIGS. 3-5, in an example embodiment, the retainer 10 includes six circumferentially spaced resilient internal retainer arms 70. However, more or fewer than six retainer arms 70 could be present in various embodiments.

In an example embodiment, the external flange 72 includes a plurality of circumferentially spaced, axially extending slots 86 effectively dividing the flange 72 into a plurality of external retainer arms 84. An inwardly extending protrusion or lip 82 is provided at a forward end of each of the external retainer arms 84. Semi-circumferential tooling slots or openings 94 are formed through the external flange 72 near the joining member 74 for receiving a removal tool, as will be explained in greater detail below.

As shown in FIGS. 1 and 2, the first inner wall section 60 and second inner wall section 62 of the female member 14 are large enough to allow the annular ring 22 (or an expanded end portion) of male member 12 to pass by the first and second wall sections 60 and 62 into the cavity 40 during insertion of the male member, yet large enough to retain the ring 22 (or expanded end portion) when combined with the thickness of the internal retainer arms 70 once the retainer 10 is moved into place, as described below.

The connecting end 44 of the female member 14 includes a substantially planar end surface for abutting the inner surface 90 of joining member 74. The outer diverging wall portion 54 and inner diverging wall section 60 each act to displace the external retainer flange 72 outwards and the internal retainer arms 70 inward, respectively, during mounting of the retainer 10 to the female member 14.

FIG. 1 shows the connector assembly in an assembled state, and FIG. 2 shows the connector assembly in an unassembled state. In operation, the male member 12 is inserted into the female member 14 such that the ring 22 is positioned in groove 56. When the ring 22 is positioned in groove 56, the inner side 58 of the groove 56 acts on a leading side of the annular ring 22 to resist further insertion of the male member 12 into the female member 14. In the illustrated embodiment, further insertion of the male member 12 is also prevented by contact of the connecting end 20 of the male member with annular shoulder 66. Prior to insertion of the male member 12, the retainer member 10 is positioned on the male member 12 with the circumference of opening 88 located between rings 22 and 18. During insertion, as force is applied to the retainer member 10 and male member 12 in the direction of the female member 14, the interior retainer arms 70 are radially displaced inward to pass by the second interior wall section 62. Due to the resilient nature of the retainer arms 70, they displace outwards again to extend axially when they reach the groove 56. During insertion of the retainer arms 70, the bevelled first interior wall section 60 of the female member 14 facilitates the insertion of the internal retainer arms 70.

At the same time that the internal retainer arms are inserted internally into the female member cavity 40, the external retainer flange 72 is outwardly displaced around the first outer wall portion of the female member 14. Due to the resilient nature of the external retainer arms 84 of external flange 72, the arms deflect inward once the lip portion 82 reaches shoulder area 48. The outer wall bevelled section 54 facilitates the outward deflection of external arms 84 during mounting of the retainer member 10. In an example embodiment, the lip 82 is bevelled in a complementary fashion to outer bevelled wall section 54 to facilitate mounting of the retainer 10.

Thus, as can be appreciated from FIG. 1, the inner retainer arms 70 extend a sufficient distance from the disc member 74 such that the outwardly directed ends 76 of the internal retainer fingers 70 extend into groove 56 of the female member 14. The external arms 84 are dimensioned such that when the inner surface 90 of joining member 74 bears against the first end 44 of the female member 14, the lip 82 snaps into engagement with female member external shoulder 48.

Both the internal retainer arms 70 and external retaining flange 72 and the cooperating portions of female member 14 are configured such that during assembly of the connection both the internal retainer arms 70 and the external retainer flange 72 snap into place when the connector is fully assembled. This snap-fit provides the person assembling the connector with an audible feedback and a physical "snap" feel feedback indicating that connection is complete. The assembler can also feel the joining member 74 abutting against the end 44 of the connecting member, thereby providing further physical feedback of the connection. Additionally, the assembler is provided with visual feedback of the connection through axial slots 86 that are provided about the circumference of external retainer flange 72.

The retainer 10 secures the male member 12 to the female member 14 in two ways. Firstly, in the event that axial force is applied to attempt to remove the male member 12 from the female member 14, the interference created between the ring 22, the internal shoulder 46 of female member groove 56 and the internal retainer arms 70 act against male insert 12. Thus, upon application of an axial force to attempt to remove male member 12 from female member 14, a compressive force is applied by the shoulder 16 of ring 22 and the shoulder 46 of groove to the opposite sides 78, 80 of the ends 76 of the internal retainer arms 70. Secondly, the inward lip 82 of external retainer flange 72 externally engages the shoulder 48 on the external wall of the female member 14, further acting against separation of the retainer 10 from the female member 14. In addition to acting against axial separation of the male and female members, the external flange 72 of retainer 10 also acts against lateral side to side or rocking movement of the male member 12 relative to the female member 14, thereby reducing wear on the seal ring 26.

The retainer 10, when engaged, acts as a cap to prevent debris and corrosive materials from entering the female connector, thus reducing the chance of corrosive or other materials from entering the joint area between the male and female members 12 and 14 and corroding the connection or otherwise affecting the seal therebetween.

As best seen in FIGS. 1 and 2, the joining member 74 of the retainer 10 in an example embodiment includes a flange or lip 92 that extends axially outward about the circumference of the central opening 88. The lip 92 effectively provides the joining member 74 with an enlarged surface area about the circumference of central opening 88 for surrounding the male member 12. The lip 92 cooperates with a further shoulder or ring 18 provided on the male member 12. Annular ring 18 may be formed integrally with male member 12, or may be a separate component secured to male member 12. The annular ring 18 and central opening 88 are respectively sized such that the retainer 10 can be pushed on the male member 12 with the ring 18 passing through the central opening 88 during insertion. The ring 18 temporarily displaces the resilient material of joining member 74 about the circumference of opening 88 when it passes through the opening 88 during mounting of the retainer 10 on the male member 12. As shown in FIG. 1, once the retainer 10 is mounted on the male member 12, the ring 18 has an outer diameter that is greater than the diameter of the central opening 88, with a distal end of the lip 92 generally abutting against or extending close to annular ring 18. The combination of annular ring 18 and lip 92 functions both to keep the retainer 10 in place on the member 12 when the member 12 is not secured to the female member 14, and also to provide a seal against debris and potentially corrosive material from entering the connection through the joint between the joining member 74 and the male member 12.

As can be seen in the Figures, in the illustrated embodiment the outer retainer flange 72 extends a further distance from the joining member 74 than the internal arms 70. Thus, in an unconnected state, the longer outer external retainer flange 72 protects the shorter internal retainer arms 70 from damage or breakage which may otherwise occur, especially in situations where the retainers are shipped pre-mounted on the male members 12. In some embodiments, the external flange 72 is sufficiently long to extend over and protect sealing ring 26 during shipping.

Figure 8:
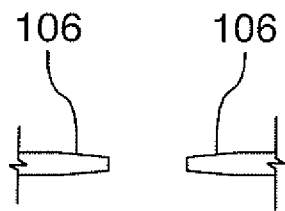
FIG. 8 is a partial end view of engagement ends of the removal tool of FIG. 7.
Figure 7:
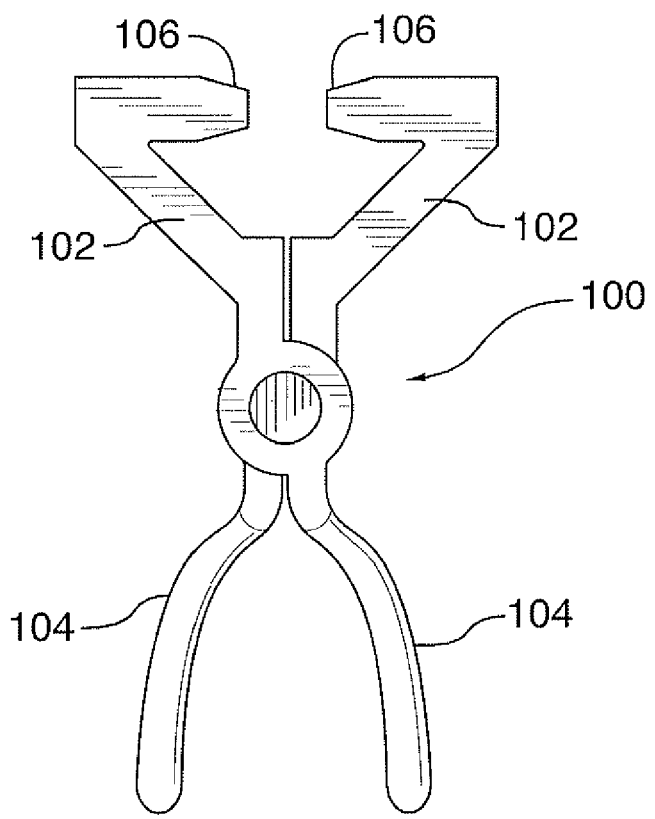
FIG. 7 is a side elevation of a removal tool for use with a connecter assembly of FIG. 1 according to example embodiment.

In an example embodiment, the retainer cap 10 can be removed by using a removal tool in conjunction with circumferential slots 94 which are provided through connector flange 72. An example of a suitable hand-held pliers-like removal tool 100 is shown in FIG. 7 in a closed state. The removal tool 100 includes a pair of pivotally mounted jaws 102 which can be moved apart from each other to an open state by pivoting handles 104 away from each other and which can be moved towards each other to the closed state by squeezing handles 104 together. Each jaw member 102 includes an inwardly facing engagement end 106 which is adapted to fit through one of the tooling slots 94 in the retainer 10. In an example embodiment, in the closed state the opposed engagement ends 106 are spaced apart from each other a distance that is greater than an outer circumference of the inner retainer arms 70, but less than the largest circumference of the female first wall section 60. Additionally, as best seen in FIG. 8, the ends 106 are wedge-shaped so that they can be wedged between the female member end 44 and the inner surface of joining member 74. Accordingly to remove retainer cap, the engagement ends 106 of removal tool 100 are inserted through opposite facing tooling slots in the retainer 10, and then handle members 104 are squeezed together. This causes the engagement ends 102 to wedge between the connecting end 44 of the female member and the inner surface 90 of the joining member 74. The axial force provided by the wedging of ends 102 of tool 100 between the female member end 44 and the inner surface 90 of joining member 74 is sufficient enough to disengage the lip 82 on outer flange 72 from the female member 14, and to withdraw internal retainer arms 70 from female member groove 56. Accordingly, with tool 100, retainer member 10 can be quickly disengaged from the female member 14, thereby allowing separation of the male member 12 from the female member 14.

In an alternative example embodiment, in addition to wedging between the female member end 44 and retainer joining member 74, the engagement ends 106 of tool 100 are spaced closed enough together when in the closed state to engage and radially compress the internal retainer arms 70 to further assist in disengaging the internal retainer arm ends 76 from the female member groove 56. As best seen in FIG. 1, the retainer arms 70 are radially spaced from the male member 12 to permit such radial compression. In such alternative embodiment, the tool ends 106 may be curved to accommodate the curved outer surfaces of the internal retainer arms 70.

Various changes may be made to the connector described herein without departing from the scope of invention. By way of example, the retainer arms 70 are each shown as having a uniform length in the figures. However, in some embodiment not all the internal retainer arms 70 may be the same size or length, for example, alternating arms 70 could have different lengths to provide for different insertion, securing and removal forces depending on the use of the connector assembly. In some embodiments, the end 76 of each arm could be enlarged relative to the rest of the arm 70. A larger cross-sectional thickness for end 76 can in some applications increase burst-strength, while a smaller cross-sectional thickness for the rest of the arm 70 can increase flexibility of the arms and thereby lower the required insertion force. In some embodiments, an outer retainer flange 72 may not include lip 82, but just rather employ a friction fit between the fingers 84 and outer wall 50 of the female member. In some embodiments, all or parts of the retainer 10 could be coated with silicon or Teflon™ or other low friction coating 96 to facilitate mounting of the retainer 10 (see FIG. 4). Although the connector assembly has been described above as being used in combination with tubular members, a connector could also be used to connect non tubular male and female members.

Figure 9:
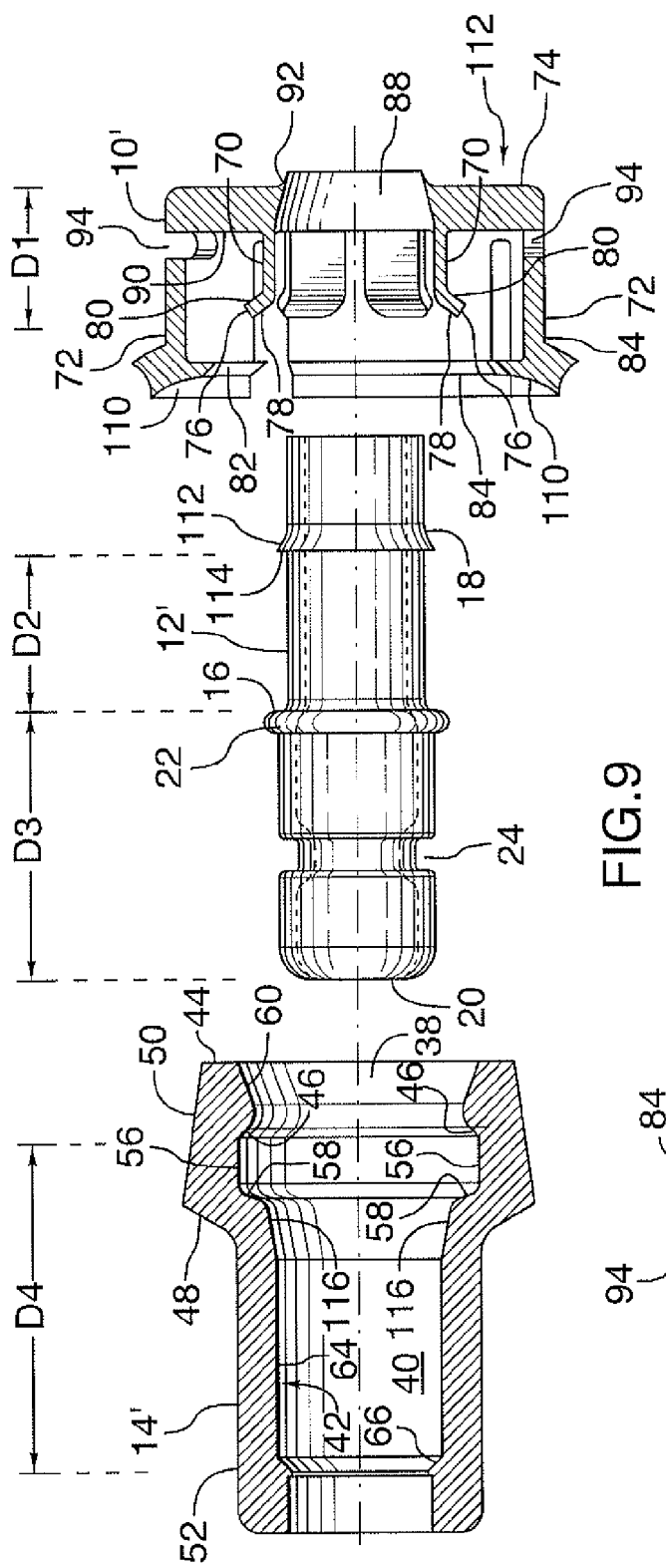
FIG. 9 is a sectional view of a connector assembly in a disassembled state in accordance with a further example embodiment of the invention in a disassembled state.
Figure 10:
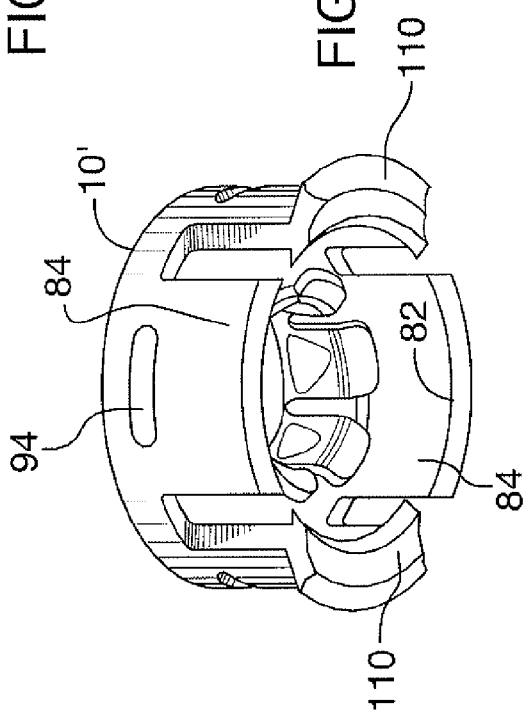
FIG. 10 is a perspective view of a retainer of the connector assembly of FIG. 9.

FIG. 9 shows a connector assembly according to yet a further example embodiment of the invention. The connector assembly of FIG. 9 is substantially the same as that shown in FIGS. 1-6 and described above except for differences described below and shown in FIG. 9. The retainer member 10' of the connector assembly of FIG. 9, which is configured so that tool 100 is not required for its removal, is also shown in FIG. 10. In such retainer member 10', a radially outward protrusion is provided at the forward end of flange 72. More particularly, a radially outwardly extending protrusion or finger grip 110 is provided at the forward end (i.e. the end that extends over female member 14) of each of the external retainer arms 84. As seen in FIGS. 9 and 10, the finger grip 110 as shown has an angled concave forward face such that a pulling force on the forward face results in both radial and axial forces being applied to outer retainer arms 84. As will be explained in greater detail below, the finger grip 110 is provided to allow a person to apply force on retainer arms 84 to facilitate separation of the members of the connector assembly.

In the retainer member 10' of FIGS. 9 and 10 the central opening 88 through the joining member 74 has a varying diameter that gets larger or tapers outward from the back surface 112 of the joining member 74 (i.e. the surface of the retainer member that faces away from the female member 14) to the forward surface of the joining member 74 (i.e. the surface from which internal retainer arms 70 extend). The tapering diameter of central opening 88 facilitates its movement along male member 12', while at the same time ensuring that unwanted movement of the joining member 74 beyond the area between shoulder 16 and annular projection 18 of male member 12' is minimized.

In the male member 12' of the connector assembly of FIG. 9, annular projection 18 has a back portion 112 of gradually increasing diameter which terminates at a forward shoulder 114 that is substantially perpendicular to the axis of male member 12'. The sloped back portion 112 allows the retainer member 10 to be slipped onto the male member 12' over the annular projection 18 with relative ease, but the perpendicular shoulder 114 acts against easy removal of the retainer member 10 from the male member 12'. Although projection 18 has been described as annular, in some embodiments, a number of spaced apart projections circumferentially arranged around the male member 12' are used instead of a continuous annular projection. In the connector assembly of FIG. 9, the distance D1 from the back end of the retainer member central opening 88 to the forward ends 76 of the inner retainer arms 70 is less than the distance D2 from the annular projection 18 to the shoulder 16, thus permitting the retainer member 10' a predetermined degree of axial movement when it is mounted in place on the male member 12'.

The first outer wall section 50 of the female member 14' of the connector assembly of FIG. 9 has a diameter that increases linearly from the first end 44 of the female member 14' to annular shoulder 48. This chamfered profile assists in guiding and aligning the retainer member 10' during connection of the male member 12' and retainer member 10' to the female member 14'. In the connector assembly of FIG. 9, the length D4 in female member cavity 40 from the shoulder 46 to the leading end shoulder 66 is greater than the distance D3 from the male member ring 22 to the forward end 20 of the male member 12', and the relative sizes of ring 16, groove 56 and retainer arm ends 76 selected, such that a predetermined degree of axial movement between the male member 12' and the female member 14' is permitted when the two are connected together. The third wall section 64 of the cavity 40 includes a tapering portion 116 adjacent the shoulder 58 of grove 56 to assist in guiding the forward end 20 into the cavity 40 during connection of the male and female members 12', 14'. As shown in FIG. 9, the forward end 20 of male member 12' has chamfered edges to facilitate its insertion.

The connector assembly of FIG. 9 operates in a similar manner to the connector assembly of FIG. 1-6, with some differences that will be apparent from the following description. Prior to connecting the male member 12' to the female member 14', the retainer member 10' is mounted onto the male member 12' with central opening 88 encircling a portion of the male member 12' between the ring 22 and protrusion 18. As indicated above, the retainer member has a degree of axial play in such position.

To connect the male and female members, the male member 12' is inserted into the female member 14' such that the ring 22 is positioned in groove 56. During insertion, the shoulder 114 of male member 12' forces the retainer cap 10' into engagement with the female member 14, and in particular, the interior retainer arms 70 are radially displaced inward by bevelled wall section 60 and then due to the resilient nature of the retainer arms 70, they displace outwards again to extend axially when they reach the groove 56.

At the same time that the internal retainer arms 70 are inserted internally into the female member cavity 40, the external retainer flange 72 is outwardly displaced around the first outer wall portion 50 of the female member 14. Due to the resilient nature of the external retainer arms 84 of external flange 72, the arms deflect inward once the lip portion 82 reaches shoulder area 48. The bevelling, or outwardly tapering, of the outer wall 50 facilitates the outward deflection of external arms 84 during mounting of the retainer member 10. In an example embodiment, the lip 82 is bevelled in a complementary fashion to outer bevelled wall 50 to facilitate mounting of the retainer 10.

As the male member ring 22 is positioned in groove 56, the inner side 58 of the groove 56 acts on a leading side of the annular ring 22 to resist further insertion of the male member 12' into the female member 14'. The male and female and retainer members 12', 14' and 10' are configured such that as the male member 12' is fully inserted into the female member 14', both the internal retainer arms 70 and the external retainer flange 72 snap into place. This snap-fit provides the person assembling the connector with an audible feedback and a physical "snap" feel feedback indicating that connection is complete. The assembling person can also feel the joining member 74 abutting against the end 44 of the connecting member, thereby providing further physical feedback of the connection. Additionally, the assembler is provided with visual feedback of the connection through axial slots 86 and circumferential slots 94 that are provided about the circumference of external retainer flange 72. When the connector assembly of FIG. 9 is together, the male member 12' is provided with a limited degree of axial movement relative to the female member 14' and retainer member 10'. The extent of such axial play or movement is determined by the relative sizes of groove 56, retainer arm ends 76 and ring 22, as well as by the differences between distances D3 and D4. Such axial play permits the retainer member 10' to be snapped into place by applying force on the male member 12' and relying on the male member 12' to apply, via shoulder 114, sufficient force on the retainer cap 10', resulting in a "single push" connection. Such axial play also facilitates separation of the male and female members, as will be described below.

The retainer 10' secures the male member 12' to the female member 14' in two ways. Firstly, in the event that axial force is applied to attempt to remove the male member 12' from the female member 14', the interference created between the ring 22, the internal shoulder 46 of female member groove 56 and the internal retainer arms 70 act against male insert 12'. Thus, upon application of an axial force to attempt to remove male member 12' from female member 14', a compressive force is applied by the shoulder 16 of ring 22 and the shoulder 46 of groove to the opposite sides 78, 80 of the ends 76 of the internal retainer arms 70. Secondly, the inward lip 82 of external retainer flange 72 externally engages the shoulder 48 on the external wall of the female member 14', further acting against separation of the retainer 10 from the female member 14. In addition to acting against axial separation of the male and female members, the external flange 72 of retainer 10 also acts against lateral side to side or rocking movement of the male member 12' relative to the female member 14', thereby reducing wear on the seal ring 26 (see FIG. 1).

In an example embodiment, the retainer member 10' can be removed by gripping the finger grip 110 with a person's fingers and pulling the retainer member 10' away from the female member 14'. Such force causes the inner lips 82 to disengage from shoulder 48. Prior to the retainer member 10' being pulled away from the female member 14', the person disconnecting the members pushes male member 12' into the female member 14" so that the ring 22 goes further into groove 56, taking pressure off the retainer member interior arm ends 76 such that the interior arms can be moved out of groove 56 when the retainer member 10' is pulled by finger grip 110. The male member 12' and retainer cap 10' can then be separated from the female member 14'. Thus, a removal tool is not required for the connector assembly of FIG. 9

Figure 11:
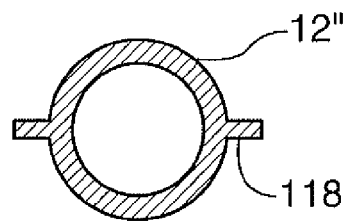
FIG. 11 is a sectional view of a male member according to a further example embodiment of the invention.
Figure 12:
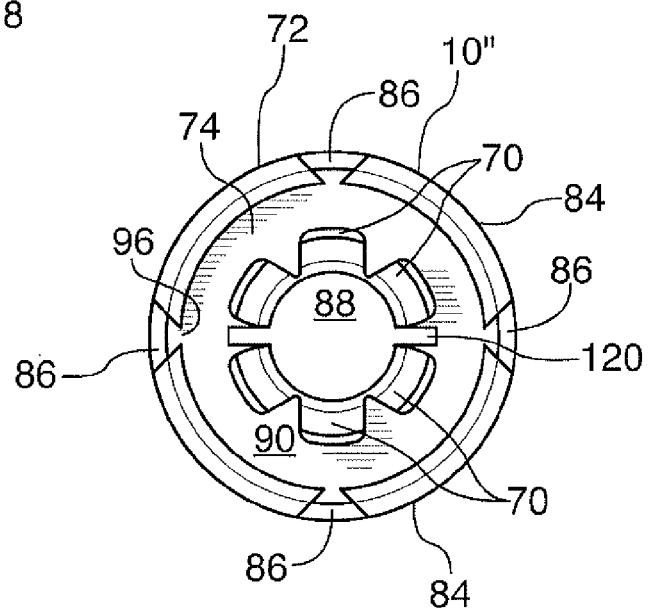
FIG. 12 is an end view of a retainer for use with the male member of FIG. 11.
Figure 13:
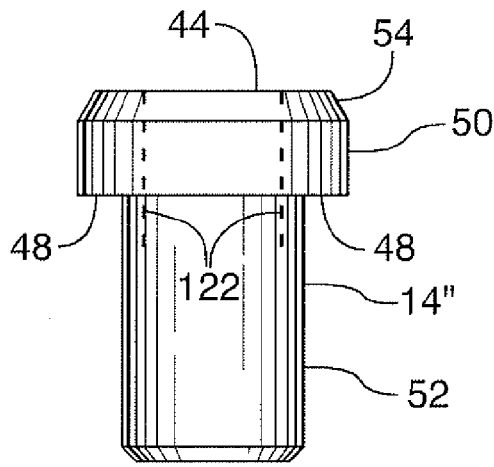
FIG. 13 is a side elevation of a female member for use with the male member of FIG. 11.

In some example embodiments, the components are keyed to prevent rotational movement between the components when the connector assembly is together. By way of example, FIGS. 11, 12 and 13 show a male member 12", a retainer member 10" and a female member 14", respectively of a connector assembly according to a further example embodiment of the invention. The connector assembly of FIGS. 11-13 is substantially identical to that of FIGS. 1-6, however anti-rotational keying has been added to each of the components. In particular, elongate ribs 118 are provided along an outer surface of the male member 12", and corresponding slots 120 for receiving the ribs are provided in retainer member 10". Corresponding slots for receiving the ribs 118 are also provided internally in the female member 14", as represented by dashed lines 122 in FIG. 13. Thus, when the components 12", 10" and 14" are assembled together, ribs 118 extend into retainer member slot 120 and female member slot 122 preventing relative rotational movement of the components. In some embodiments, different keying configurations may be used, and in some embodiments more or less than two ribs 118 may be used. The anti-rotational keying shown in FIGS. 11-13 can be applied to the connector assembly of FIG. 9.

Figure 14:
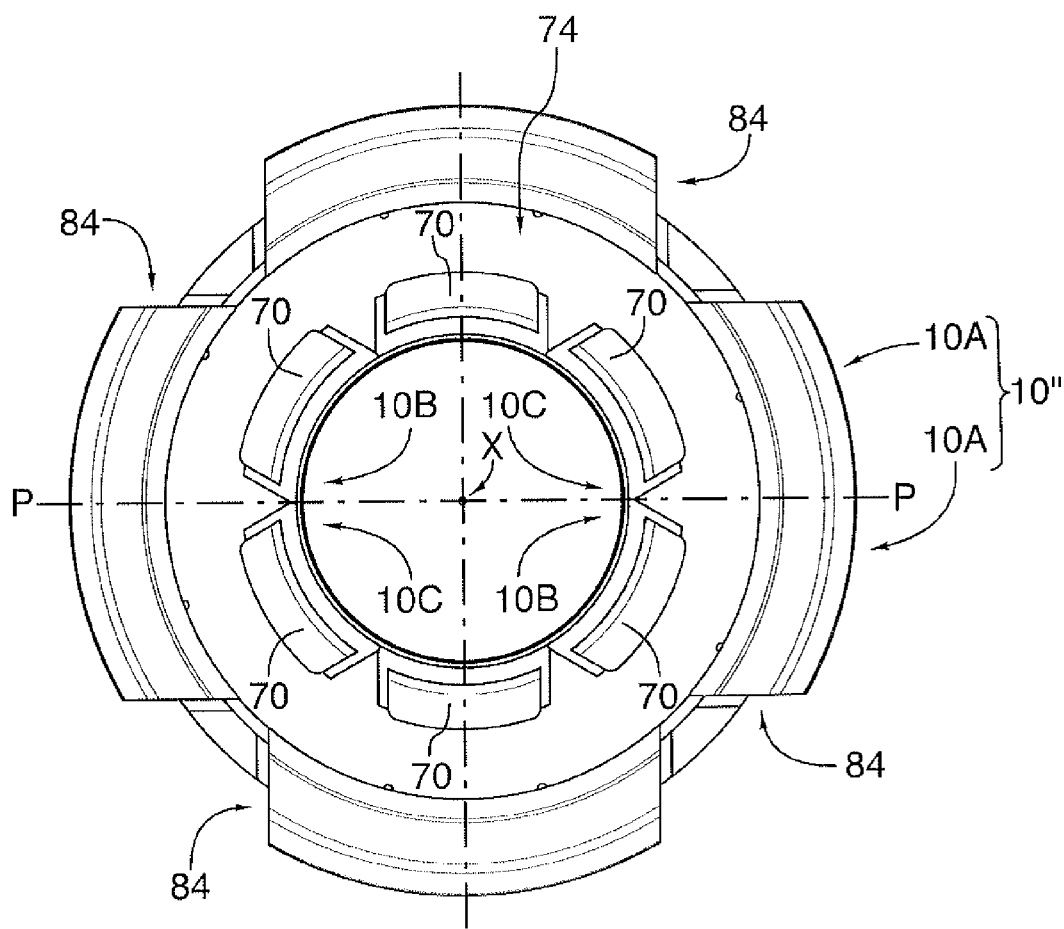
FIG. 14 is an end view, similar to FIG. 4, of a retainer member according to a further example embodiment of the invention.

A further alternative example embodiment of the retainer member is illustrated in end view in FIG. 14 and designated as 10'''. This annular retainer member 10''' will be seen in FIG. 14 to be generally similar in structure to retainer member 10' of FIGS. 9 and 10, and numbered similarly. However, this retainer member 10''' is substantially bisected into two identical retainer portions 10A by a plane P-P oriented parallel to and coincident with the axis X of the retainer member 10''', such that each retainer portion 10A substantially forms a 1800 sector of said retainer member 10''' having circumferentially spaced ends 10B, 10C, the retainer portions 10A, 10A being rigidly secured to one another in snap-fit relation in the retainer member 10''' shown.

The manner in which such snap-fit, rigid securement is provided is fully discussed in following paragraphs.

The structure of these retainer portions 10A is now described with reference to FIGS. 15-27, which show various views of exemplary retainer portion 10A.

Figure 15:
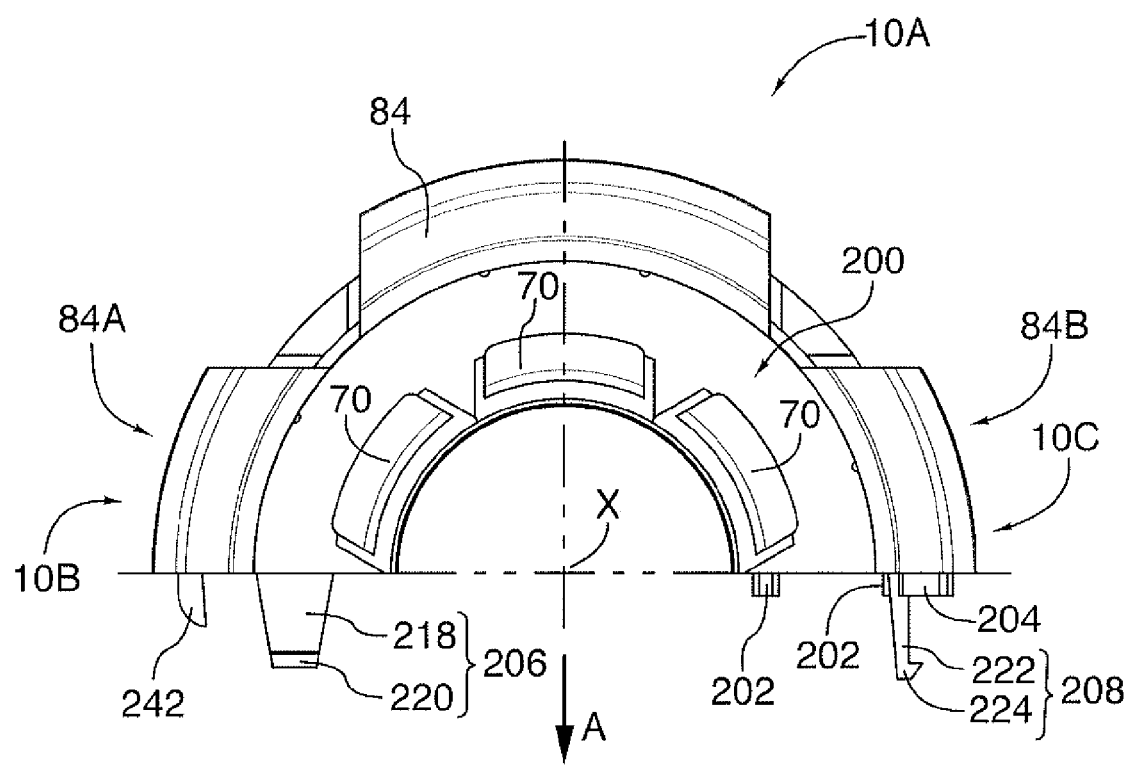
FIG. 15 is an end view of one portion of the retainer of FIG. 14.
Figure 16:
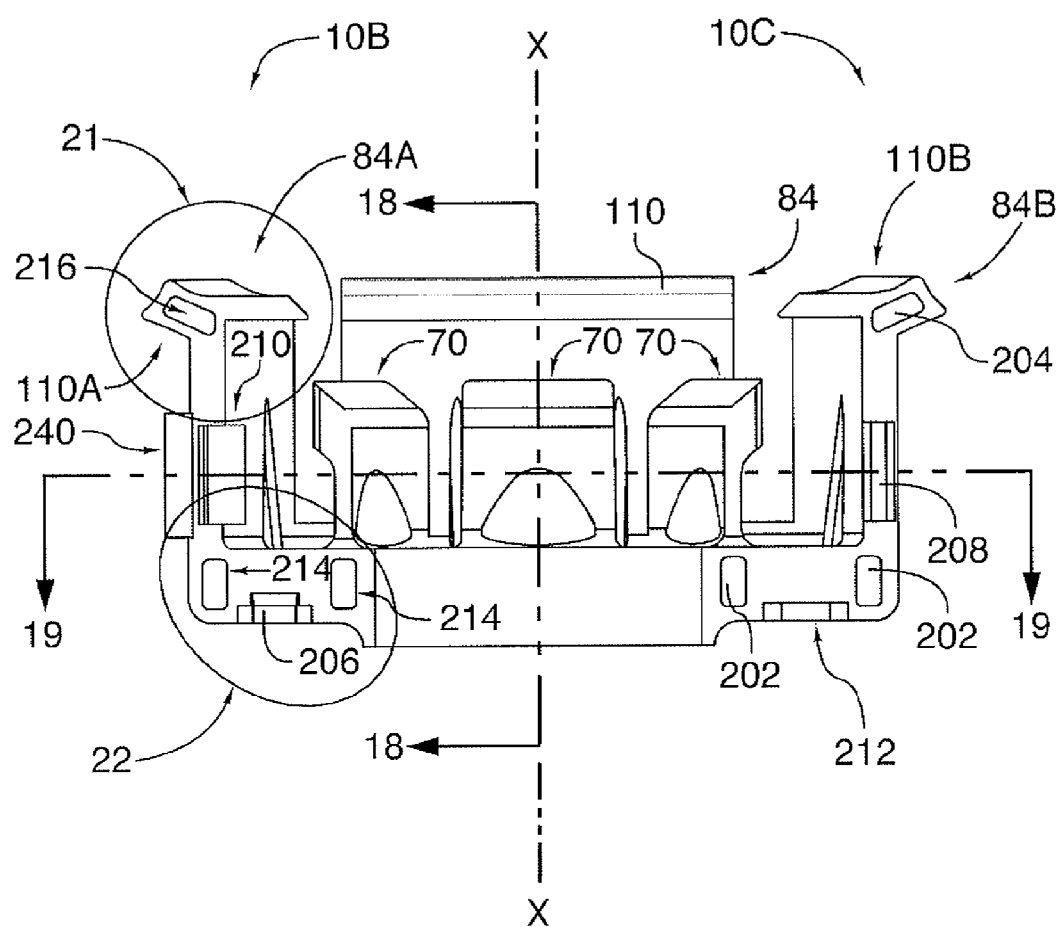
FIG. 16 is an inside view of the structure of FIG. 15.

With general reference to FIGS. 15, 16, each retainer portion 10A is an injection-molded plastic article including a 180° sector 200 of the joining member 74 (shown in FIG. 14); three of the interior retainer arms 70; and a 180° sector of the external retaining flange 72, in the form of two of the external retainer arms 84, all as generally described hereinbefore, but for the fact that one of the two retainer arms 84 provided is bisected into portions 84A, 84B disposed at opposite ends 10B, 10C, each portion 84A, 84B terminating in a respective finger grip portion 110A, 110B.

For greater certainty, in the retainer member 10''' shown, it should be understood that retainer arm portion 84A of one of the retainer portions 10A forms an external retainer arm 84 with retainer arm portion 84B of the other of the retainer portions 10A, with finger grip portions 110A, 110B of said retainer arm portions 84A, 84B forming a finger grip 110 for said external retainer arm 84. Similarly, retainer arm portion 84B of said one of the retainer portions 10A forms another external retainer arm 84 with retainer arm portion 84A of the other of the retainer portions 10A, with finger grip portions 110B, 110A of said retainer arm portions 84B, 84A forming a finger grip 110 for said other external retainer arm 84.

Additionally, each retainer portion 10A has extending therefrom, in a common direction A, three protrusions 202, 202, 204 and a pair of hooks 206, 208 and has defined therein a pair of hook receivers 210, 212 and three sockets 214, 214, 216.

The three protrusions 202, 202, 204 each extend from end 10C, with two of the protrusions 202, 202 extending from the joining member sector 200, radially spaced from one another, and the third protrusion 204 extending from the finger grip portion 110B of the retainer arm portion 84B.

The three sockets 214, 214, 216 are each defined in end 10B, with two of the sockets 214, 214 being defined in the joining member sector 200, radially spaced from one another, and the third 216 being defined in finger grip portion 110A. The protrusions 202, 202, 204 and sockets 214, 214, 216 have a substantially constant cross-section in the common direction A, as evident from FIG. 16, which is a view of the structure of FIG. 15 in a direction parallel to the common direction A.

With reference to FIGS. 15,16, one of the hooks 206 extends from end 10B, in the joining member sector 200, between sockets 214, 214, and includes a plate-like body 218 and a forwardly-directed upturned lip 220, the body 218 tapering in width as it so extends.

The other of the hooks 208 extends from external retainer arm portion 84B and includes an elongate, rectangular body 222 which extends to a radially-outwardly extending lip 224.

Figure 17:
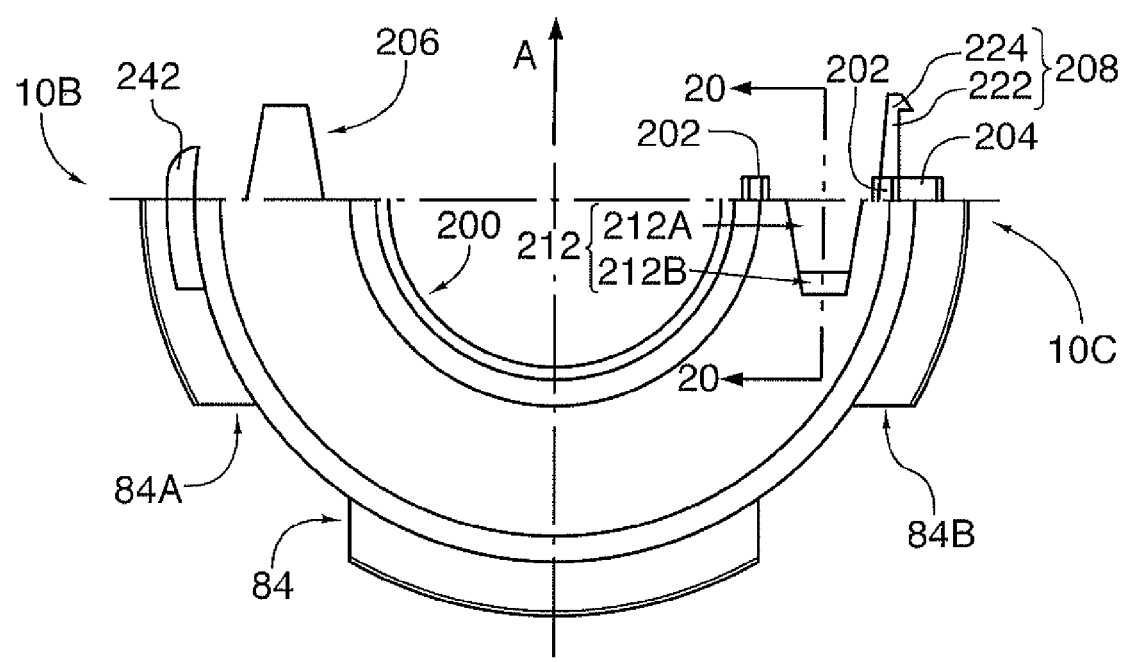
FIG. 17 is a view of the other end of the structure of FIG. 15.
Figure 18:
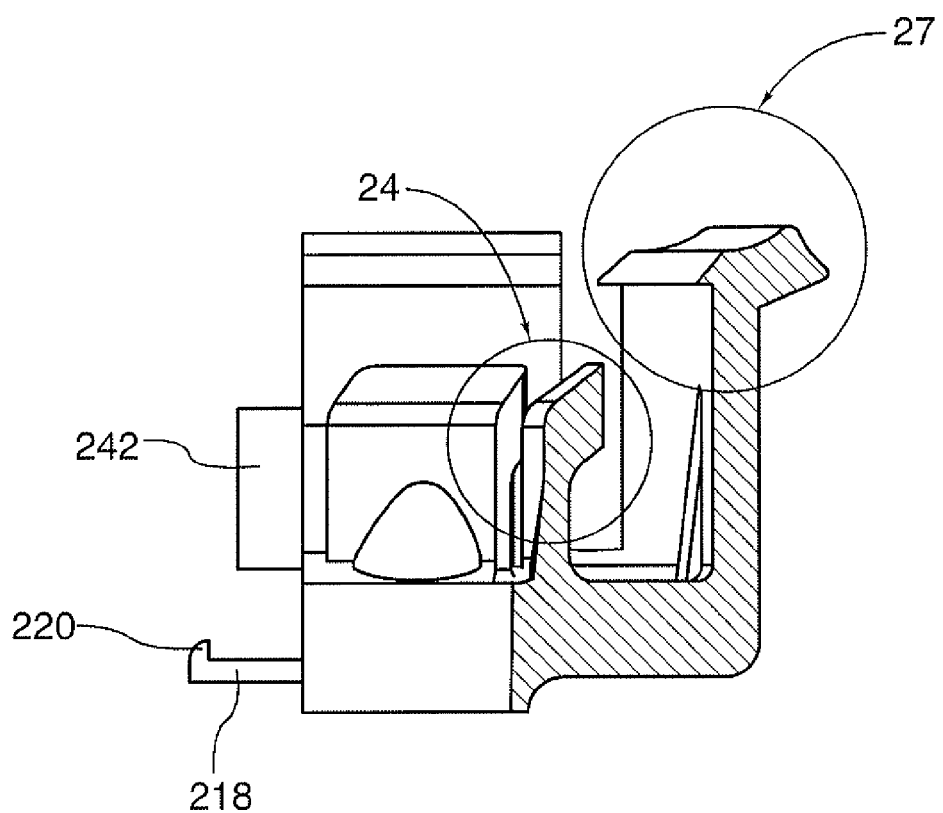
FIG. 18 is a view along section 18-18 of FIG. 16.

One of the hook receivers 212, as seen in FIG. 17, takes the form of a stepped recess in the rearward surface of end 10C having a shallow portion 212A shaped and dimensioned to receive plate-like body 218 and a deep portion 212B shaped and dimensioned to receive lip 220.

The other of the hook receivers 210 takes the form of a recess on the interior surface of the external arm portion 84A coterminous with end 10B, as illustrated in FIG. 16. Recess 210 includes a passage portion 210A and an aperture portion 210B, as illustrated in FIG. 19.

Figure 19:
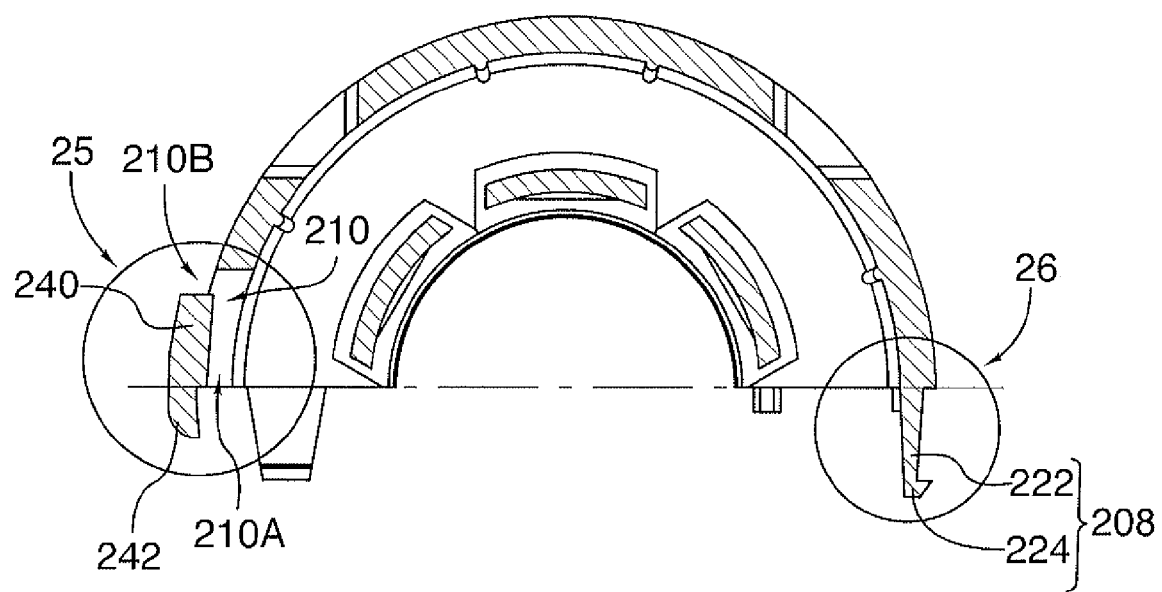
FIG. 19 is a view along section 19-19 of FIG. 16.
Figure 20:
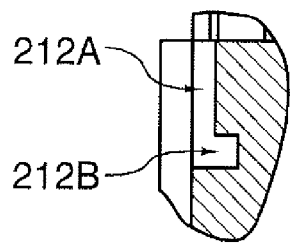
FIG. 20 is a view along section 20-20 of FIG. 17.
Figure 21:
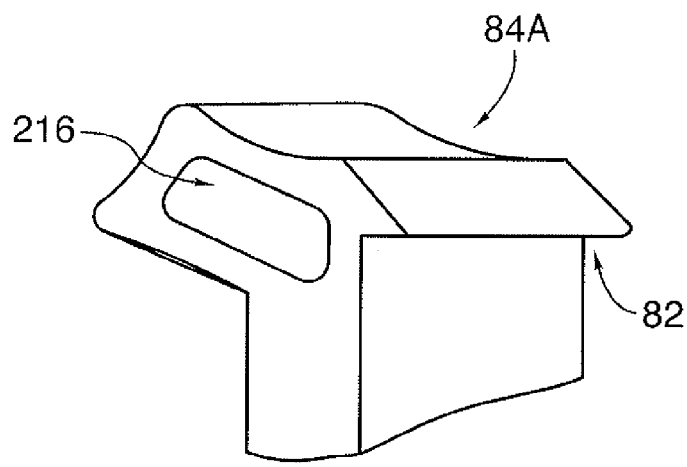
FIG. 21 is an enlarged view of encircled structure 21 in FIG. 16.
Figure 22:
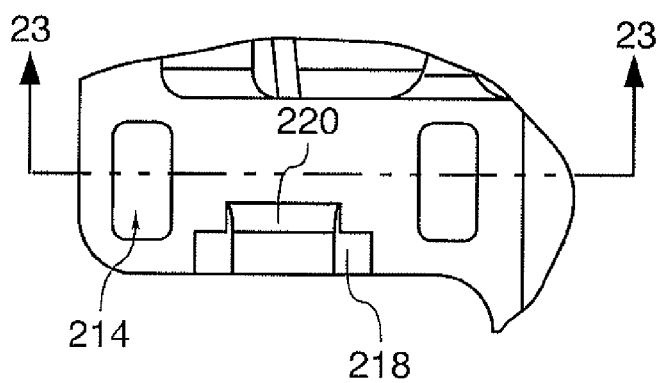
FIG. 22 is an enlarged view of encircled structure 22 in FIG. 16.
Figure 23:
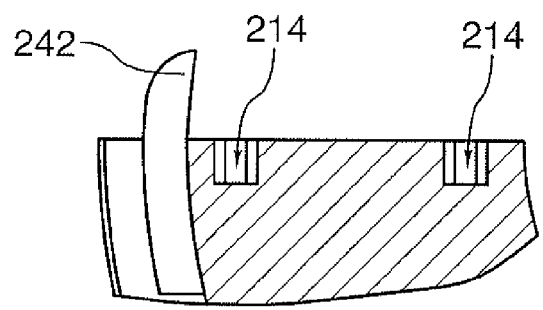
FIG. 23 is a view along section 23-23 of the structure of FIG. 22.
Figure 24:
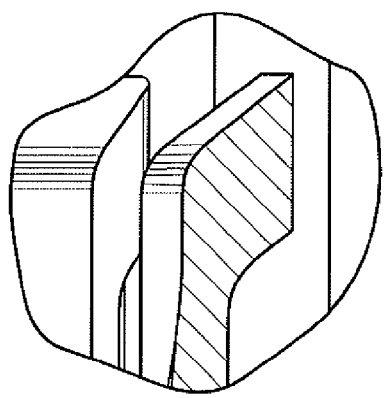
FIG. 24 is an enlarged view of encircled area 24 of FIG. 18.
Figure 25:
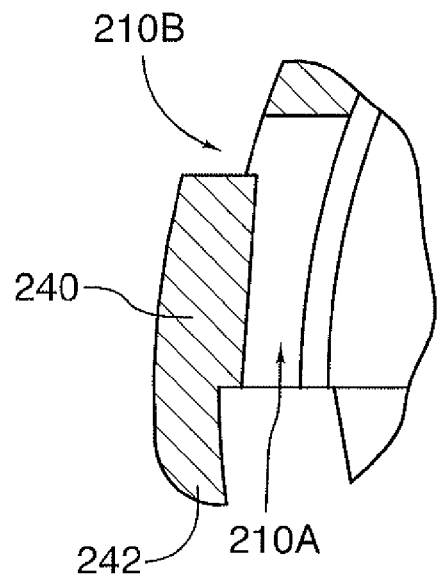
FIG. 25 is an enlarged view of encircled area 25 of FIG. 19.
Figure 26:
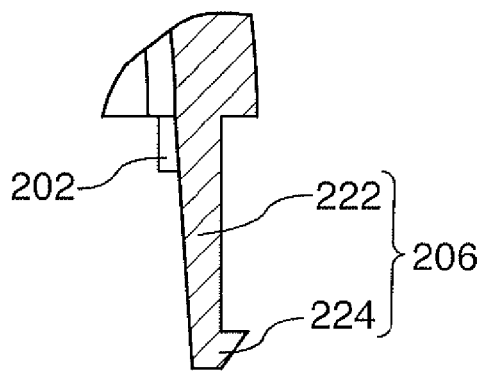
FIG. 26 is an enlarged view of encircled area 26 of FIG. 19.
Figure 27:
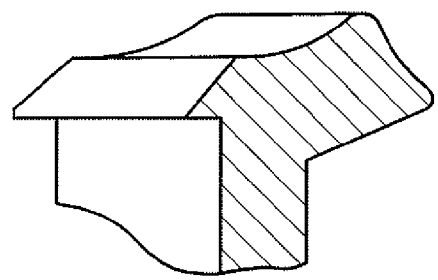
FIG. 27 is an enlarged view of encircled area 27 of FIG. 18.

Retainer portion 10A also includes a strengthening portion 240 which takes the form of an enlarged portion of external arm portion 84A, as shown in FIG. 16, and includes a protruding arm 242, best seen in FIG. 19.

In the retainer member 10''', each of the retainer portions 10A has its protrusions 202, 202, 204 received by a respective socket 214, 214, 216 of the other one of the retainer portions 10A in the manner by which a mortise receives a tenon, and has its hooks 206,208 each disposed in a locked configuration and mechanically received by a hook receiver 212, 210 of the other retainer portion 10A.

So positioned, the substantially constant cross-sections of the protrusions 202, 202, 204 and sockets 214, 214, 216 previously mentioned prevents relative movement of the retainer portions 10A, 10A otherwise than movement associated with withdrawal of the protrusions 202, 202, 204 from the sockets 214, 214, 216, i.e. relative movement of the portions 10A, 10A away from one another parallel to the common direction.

The mechanical engagement of the hooks 206, 208 and hook receivers 212, 210 prevents such withdrawal movement, such that the retainer portions 10A, 10A are locked in place against/rigidly secured to one another.

Strengthening portion 240 lends strength to the retainer 10''' that would otherwise have been lost as a result of the passage portion 210A. Protruding arms 242 lend additional strength to the retainer 10''' to resist sliding movement of portions 10A, 10A normal to axis X, and lessening the shear load that would otherwise be borne by the hooks 206, 208 and protrusions 202, 204.

Figure 28:
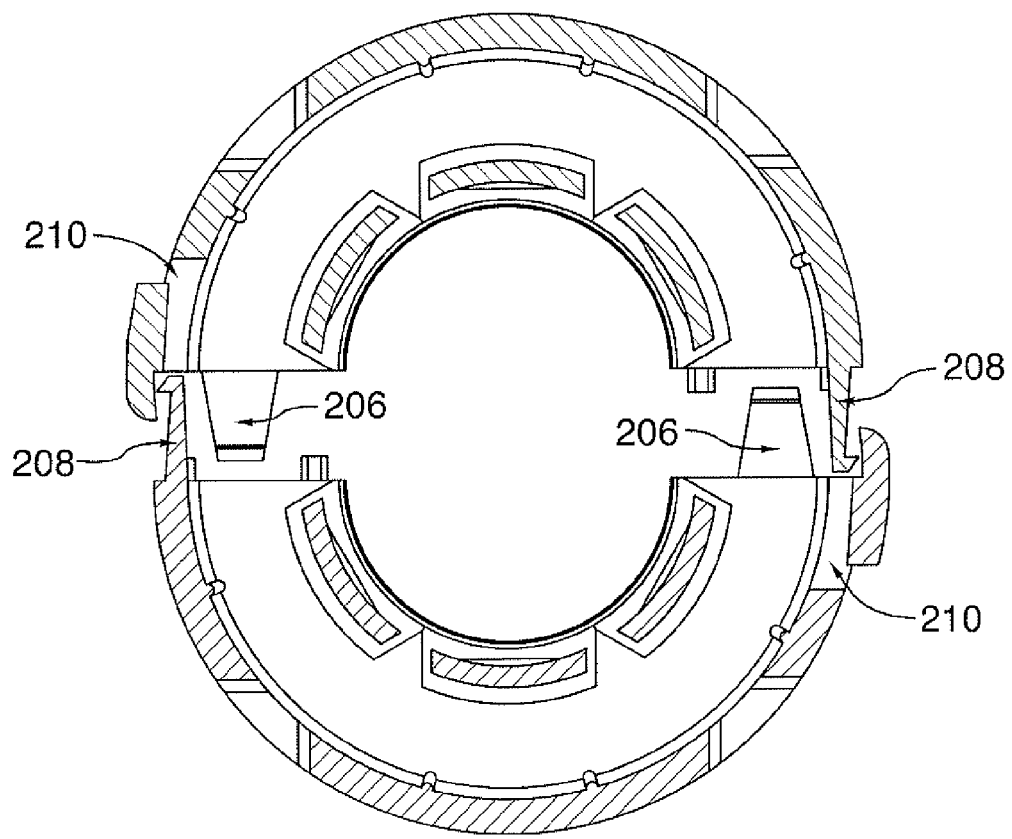
FIG. 28 is a view of a view of a pair of the structures of FIG. 19 apart from one another.

An initial stage in assembly of this retainer member 10''' involves positioning the retainer portions 10A, 10A adjacent one another, such that the sockets 214, 214, 216 and protrusions 202, 202, 204 are aligned, as indicated in FIG. 28.

Thereafter, the portions are manipulated towards one another, by causing the sockets 214, 214, 216 to receive said protrusions 202, 202, 204.

Figure 29:
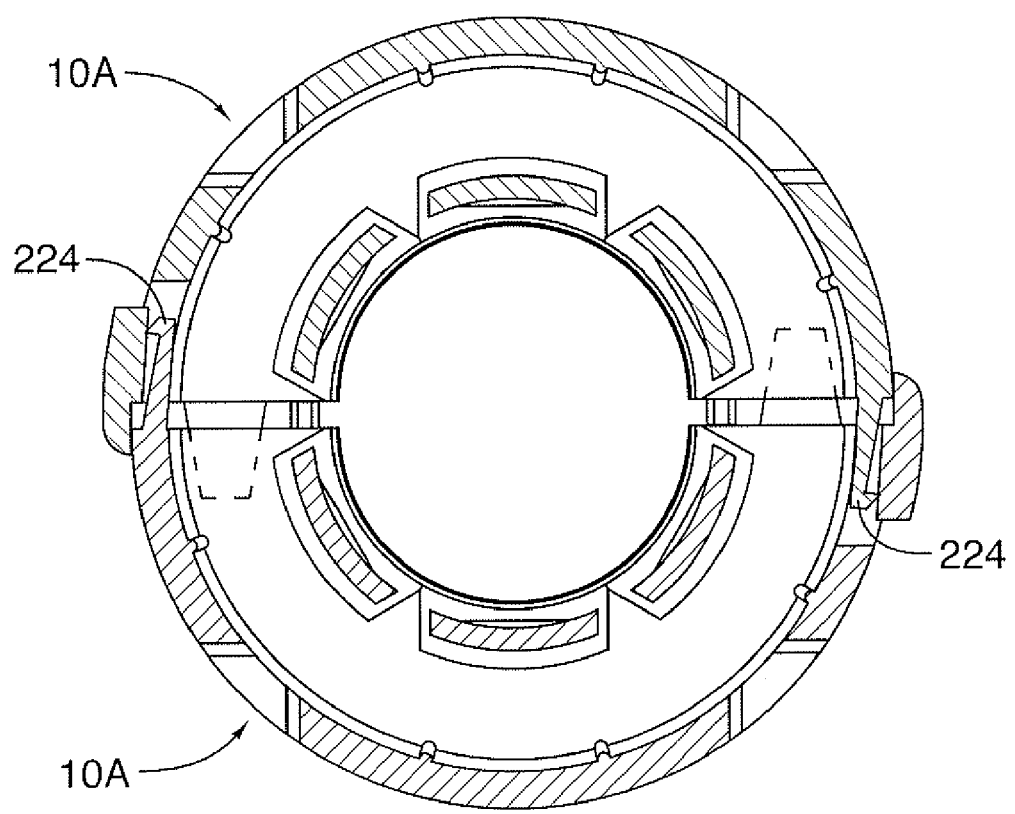
FIG. 29 is a view of the pair of structures of FIG. 28 partially engaged with one another.

During this reception step, hook 206 is initially deflected rearwardly, and upturned lip 220 rides along the surface of shallow recess 212A. At the same time, hook 208 is initially deflected radially inwardly, and lip 224 rides along the radial outer surface of passage portion 210A, the latter being shown in FIG. 29.

Figure 30:
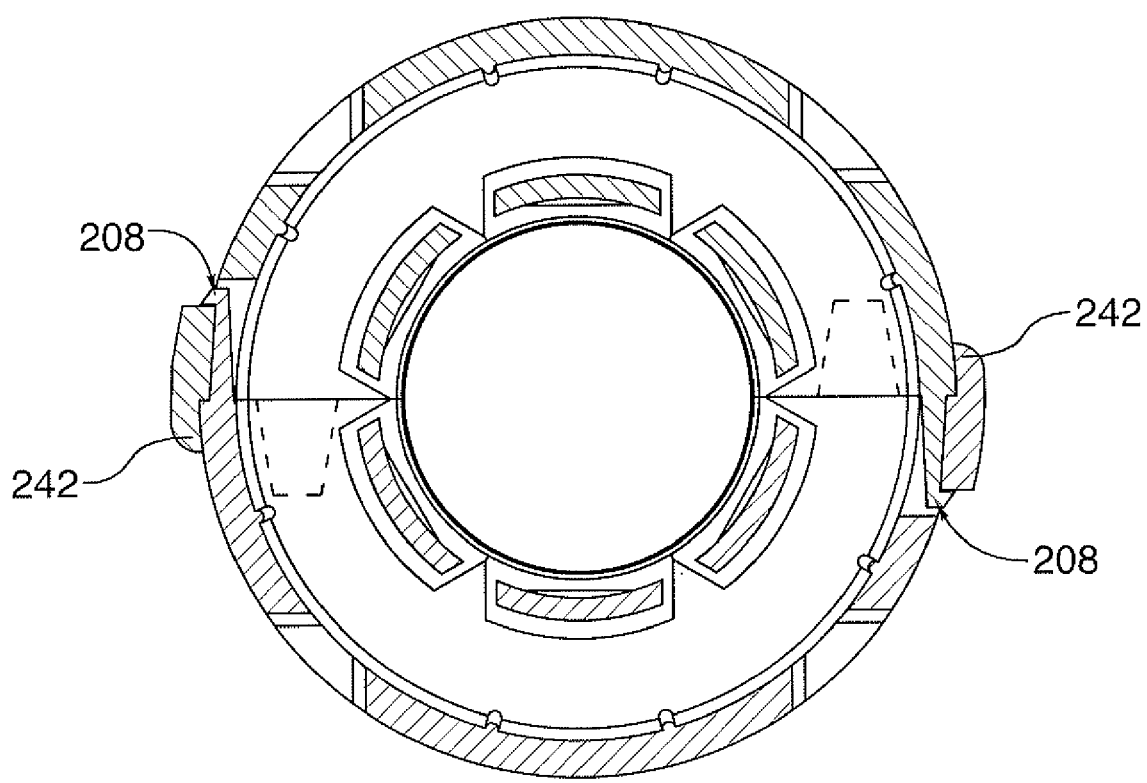
FIG. 30 is a view of the structures of FIG. 28 fully engaged and rigidly secured to one another.

As the protrusions 202, 202, 204 extend into the sockets 214, 214, 216, lip 220 reaches deep recess 212B and springs forwardly, and lip 224 reaches aperture 210B and springs radially outwardly, to a locked configuration as shown in FIG. 30, to provide the mechanical connection between the retainer portions 10A, 10A. Again, this provides the person assembling the retainer 10''' with an audible feedback and a physical "snap" tactile feedback that indicates the connection is complete.

This assembly step is advantageously performed in situ, around a fully-formed male member, prior to insertion of the male member into the female member, to releasably connect a pair of fluid-carrying conduits secured to or formed on respective ends of said conduits.

It will be evident to persons of ordinary skill in the art that this provides substantial advantage over the unitary construction.

By way of background, in applications wherein an annular ring is provided on the male member, in unitary retainer construction, the retainer must be sufficiently flexible to ride over the annular ring during assembly. Alternatively, the annular ring must be formed on or secured to the male member after the retainer has been installed, which demands either that the parts be made at the same locale, or that the retainers be shipped to the manufacturing entity tasked with forming the annular ring.

These limitations are avoided in the context of the exemplary two-piece retainer shown and described.

The retainer can therefore be made as rigid as desired; and the manufacture of the retainers and the male members can be completely separated, if desired.

Of course, whereas a two-piece retainer is described, persons of ordinary skill in the art will also readily recognize that retainers have more than two portions could readily be utilized. For example, the exemplary retainer member of FIGS. 14-30 could readily be modified to a four-part form, simply by modifying the sector angles to 90°.

As well, whereas a snap-fit mechanical connection is taught, other rigid securement operations, such as sonic welding or adhesive, could be used to secure the retainer portions together, in which case, the hooks and hook receivers and protrusions and sockets could be omitted.

Figure 31:
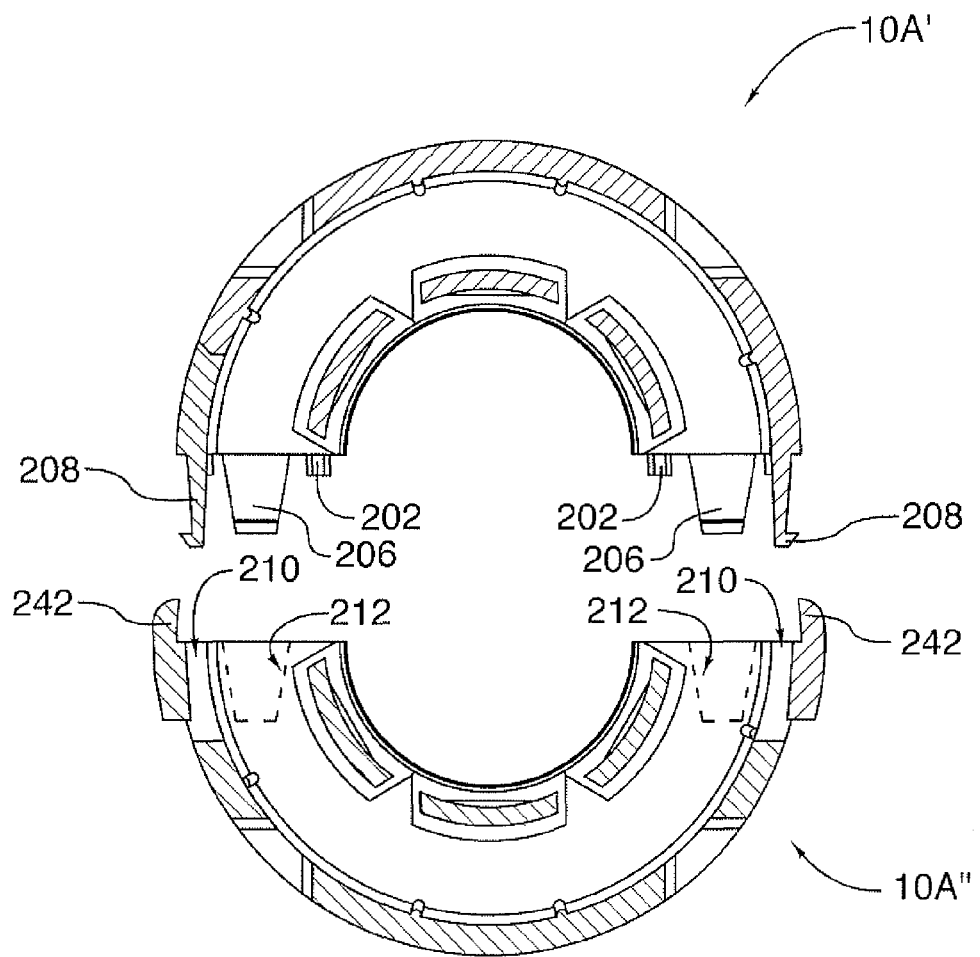
FIG. 31 is a view similar to FIG. 28 of a further example embodiment of the invention.
Figure 32:
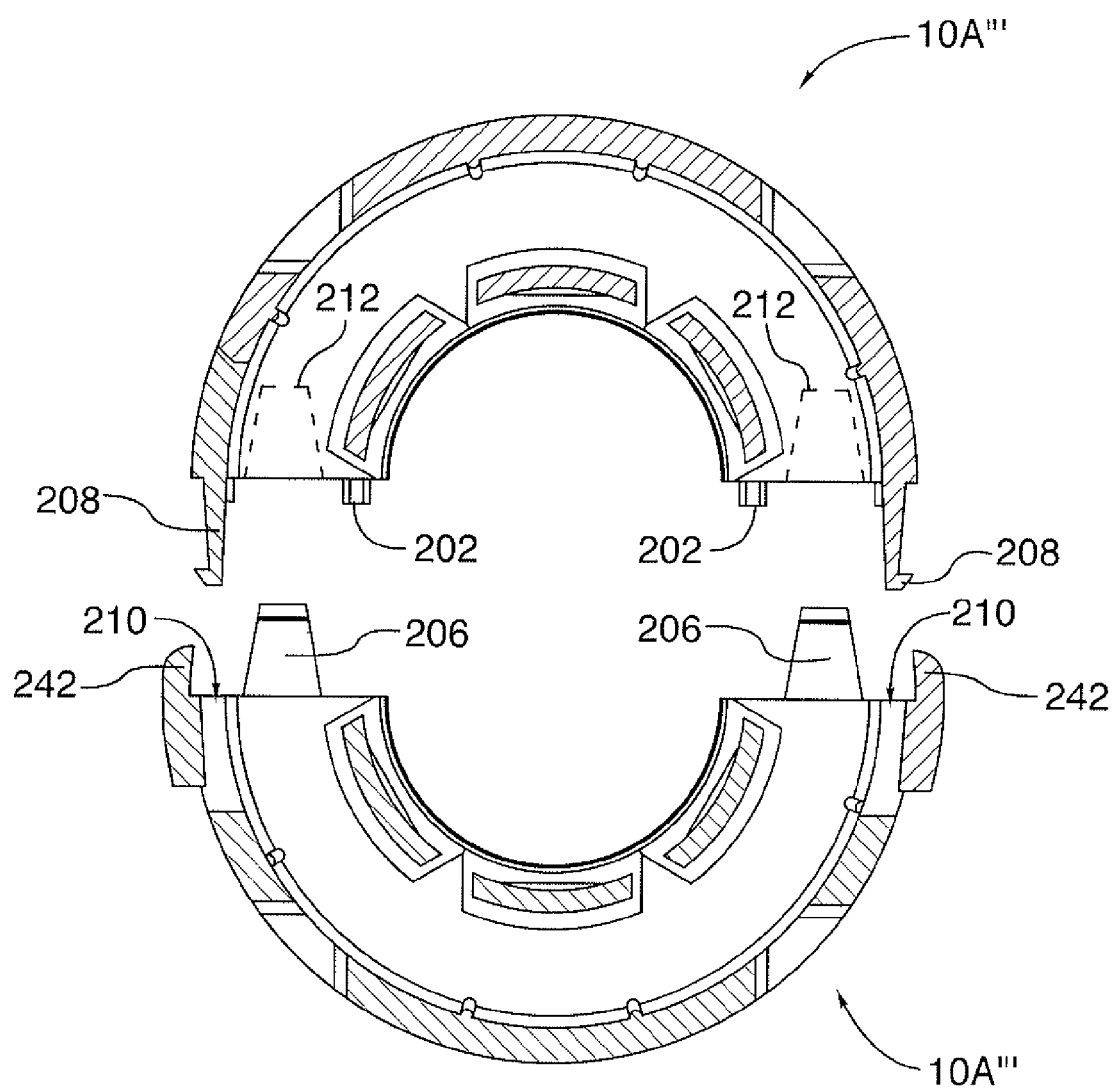
FIG. 32 is a view similar to FIG. 31 of a yet further example embodiment of the invention.

Further, whereas in the embodiment of FIGS. 17-30, two identical retainer portions are utilized to form the retainer, it is possible to produce the retainer using differentiated retainer portions, such as is shown in FIG. 31, wherein one 10A' of the retainer portions has formed thereon all of the hooks 206, 208 and protrusions 202, 204 (protrusions 204 not being visible in the view) and the other retainer portion 10A'' defines the hook receivers 210, 212 (the latter in phantom) and sockets 214, 216 (not visible in the view). Yet a further example in shown in FIG. 32, wherein one of the retainer portions 10A''' has hooks 208 and receivers 212, and the other of the retainer portions 10A''' has hooks 206 and receivers 210. Other variations in terms of the placement of the hooks, receivers, protrusions and sockets are possible, and are all contemplated to fall within the scope of the invention.

The above-described embodiments of the invention are intended to be examples only. Further alterations, modifications and variations may be effected to the particular embodiments by those skilled in the art without departing from the scope of the invention, which is defined by the claims appended hereto.

The invention claimed is:

1. A connector assembly comprising:
   a male member having a first external shoulder on an outer surface thereof;
   a female member having a cavity defined by an inner circumferential wall for receiving the male member, the cavity extending from a first end to an interior portion of the female member, the circumferential wall defining an internal shoulder; and
   at least two plastic retainer portions rigidly secured in snap-fit relation to one another to define an annular retainer member surrounding a portion of the male member, each of said at least two retainer portions forming a respective sector of said annular retainer member, the retainer member including a plurality of circumferentially spaced resilient internal retainer arms and an annular external retainer flange for engaging an outer portion of the female member, the external flange being radially spaced from the internal retainer arms and connected thereto by a radial joining member, the internal retainer arms each having a distal end for engaging the male member first external shoulder and the female member internal shoulder when the male member is within the female member.

2. The connector assembly of claim 1 wherein the female member has a circumferential external shoulder on the outer surface thereof, and the external flange has a distal end defining a radially inwardly extending protrusion for engaging the female member external shoulder.

3. The connector assembly of claim 2 wherein the outer surface of the female member is defined by an outer annular wall having a first section and a second section, the first section being located between the first end and the second section and having an outer diameter greater than that of the second section, a transition between the first section and the second section defining the female member external shoulder, wherein the external flange extends axially along the first section.

4. The connector assembly of claim 3 wherein at least a portion of the first section has a diameter that increases from the first end for expanding the distal end of the external flange radially outward as the retainer member is slid onto the female member.

5. The connector assembly of claim 2 wherein the external flange includes a plurality of axial openings dividing the external flange into a plurality of resilient axially extending external retainer fingers at least some of which have a radially inwardly extending lip for engaging the female member external shoulder.

6. The connector assembly of claim 2 wherein the external flange includes a plurality of axial openings dividing the external flange into a plurality of resilient axially extending external retainer fingers at least some of which have a radially outwardly extending finger grip.

7. The connector assembly of claim 1 wherein at least one semi-circumferential opening is formed through the external flange near the radial joining member.

8. The connector assembly of claim 1 wherein the joining member is disc shaped having a central opening through which the male member extends, the joining member having a first surface for engaging the first end of the female member.

9. The connector assembly of claim 8 wherein a diameter of the central opening varies along a length thereof.

10. The connector assembly of claim 8 wherein the joining member includes a resilient sealing flange extending axially therefrom and surrounding the central opening for engaging the male member.

11. The connector assembly of claim 1 wherein the distal ends of the internal retainer arms are adapted to be compressed between the male member first external shoulder and the female member internal shoulder when the male member is within the female member to create an interference fit therebetween.

12. The connector assembly of claim 1 wherein the distal ends of the internal retainer arms are angled radially outward and each include opposite facing first and second surfaces for engaging the male member first external shoulder and the female member internal shoulder, respectively.

13. The connector assembly of claim 1 wherein the joining member of the retainer member includes a central opening through which the male member extends, and the male member includes a further external shoulder on the outer surface thereof spaced apart from the first external shoulder and located on an opposite side of the joining member than the first external shoulder, the further external shoulder limiting axial movement of the retainer member along the male member.

14. The connector assembly of claim 13 wherein the further external shoulder is provided by an annular ring sloped at one side thereof for permitting the retainer member to be mounted on the male member and angled on an opposite side thereof for preventing removal of the retainer member from the male member.

15. The connector assembly of claim 1 wherein the external flange extends a greater axial distance from the joining member than the internal retainer arms.

16. The connector assembly of claim 1 wherein the male member, female member and retainer member are respectively sized and configured such that when the connector assembly is assembled (a) the distal ends of the retainer member internal retainer arms are received between the male member first external shoulder and the female member internal shoulder thereby acting against axial separation of the male and female members; (b) a predetermined degree of relative axial movement of the male member and the female member can occur; and (c) axial movement of the male and female members together reduces pressure applied by the male member first external shoulder and the female member internal shoulder against the distal ends of the retainer member internal retainer arms, thereby facilitating removal of the retainer member from the female member.

17. The connector assembly of claim 1 wherein the male and female members are keyed to prevent rotational movement there-between.

18. A connector assembly according to claim 1, wherein said at least two retainer portions consists of two retainer portions.

19. A connector assembly according to claim 18, wherein said retainer member is substantially bisected into said two retainer portions by a plane oriented parallel to and coincident with an axis X-X of the retainer member, such that each retainer portion substantially forms a 180 degrees sector of said retainer member.

20. A connector assembly according to claim 18, wherein each retainer portion has extending therefrom at least two protrusions, wherein each one of the retainer portions has defined thereon sockets corresponding in number to the protrusions extending from the other of the retainer portions, and wherein in the retainer member each one of the retainer portions has each protrusion received by a respective socket of the other one of the retainer portions in the manner in which a mortise receives a tenon.

21. A connector assembly according to claim 20, wherein each one of the retainer portions has a pair of hooks and defines a hook receiver for each hook of the other one of the retainer portions, each hook in the retainer member being in a locked configuration and being mechanically received by its hook receiver so as to rigidly secure said retainer portions to one another.

22. A connector assembly according to claim 21, wherein said retainer member is assembled from said two retainer portions by causing said sockets to receive said protrusions, and wherein said retainer portions are adapted such that the hooks, as the protrusions extend into the sockets, are deflected away from their locked configurations, and spring back to the locked configurations once the protrusions are received by the sockets, to provide for said snap-fit engagement of the retainer portions.

23. A connector assembly according to claim 22, wherein the radial joining member is bisected into two parts, each forming part of a respective retainer portion, wherein the annular external retaining flange is bisected into two parts, each forming part of a respective retainer portion, wherein each one of the retainer portions has one of the pair of hooks extending from its radial joining member part and the other of the pair of hooks extending from its annular external retaining flange part, wherein the hook receiver for said one hook is defined by a recess in the radial joining member part of the other retainer portion and the hook receiver for said other hook is defined by a recess in the annular external retaining flange part of the other retainer portion.

24. A connector assembly according to claim 20, wherein one of the retainer portions has at least two hooks and the other of the retainer portions defines a hook receiver for each hook, each hook in the retainer member being in a locked configuration and being mechanically received by its hook receiver so as to secure said retainer portions to one another.

25. Apparatus for releasably securing a tubular male member to a tubular female member, the tubular male member having a first external shoulder on an outer surface thereof and the tubular female member having a cavity defined by an inner circumferential wall for receiving the male member, the cavity extending from a first end to an interior portion of the female member, the circumferential wall defining an internal shoulder, the apparatus comprising:

at least two plastic retainer portions rigidly secured in snap-fit relation to one another in use to define an annular retainer member surrounding a portion of the male member, each of said at least two retainer portions forming a respective sector of said annular retainer member, the annular retainer member including a plurality of circumferentially spaced resilient internal retainer arms and an annular external retainer flange engaging an outer portion of the female member in use, the external flange being radially spaced from the internal retainer arms and connected thereto by a radial joining member, the internal retainer arms each having a distal end engaging the male member first external shoulder and the female member internal shoulder when the male member is within the female member in use.

26. The apparatus of claim 25 wherein the distal ends of the internal retainer arms are compressed between the first male member external shoulder and the female member internal shoulder when the male member is within the female member to create an interference fit therebetween.

27. The apparatus of claim 25 wherein the distal ends of the internal retainer arms are angled radially outward and each include opposite facing first and second surfaces engaging the male member first external shoulder and the female member internal shoulder, respectively, in use.

28. The apparatus of claim 25 wherein the joining member of the retainer member includes a central opening through which the male member extends in use, and the male member includes a further external shoulder on the outer surface thereof spaced apart from the first external shoulder and located on an opposite side of the joining member than the first external shoulder, the further external shoulder limiting, in use, axial movement of the retainer member along the male member.

29. The apparatus of claim 25 wherein the external flange extends a greater axial distance from the joining member than the internal retainer arms.

30. The apparatus of claim 25 wherein the male member, female member and retainer member are respectively sized and configured such that, in use (a) the distal ends of the retainer member internal retainer arms are received between the male member first external shoulder and the female member internal shoulder thereby acting against axial separation of the male and female members; (b) a predetermined degree of relative axial movement of the male member and the female member can occur; and (c) axial movement of the male and female members together reduces pressure applied by the male member first external shoulder and the female member internal shoulder against the distal ends of the retainer member internal retainer arms, thereby facilitating removal of the retainer member from the female member.

31. The apparatus of claim 25 wherein the members are keyed to prevent rotational movement there-between.

* * * * *